No. 721,310. PATENTED FEB. 24, 1903.
H. JUNKERS.
SURFACE CONDENSER.
APPLICATION FILED JAN. 20, 1902.
NO MODEL. 2 SHEETS—SHEET 1.

Witnesses:
F. G. Harder.
Jos. Schnitzler.

Inventor.
Hugo Junkers
per Martin Schmetz
Attorney.

No. 721,310. PATENTED FEB. 24, 1903.
H. JUNKERS.
SURFACE CONDENSER.
APPLICATION FILED JAN. 20, 1902.
NO MODEL. 2 SHEETS—SHEET 2.
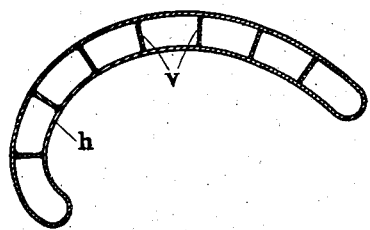
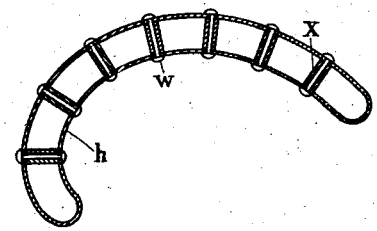
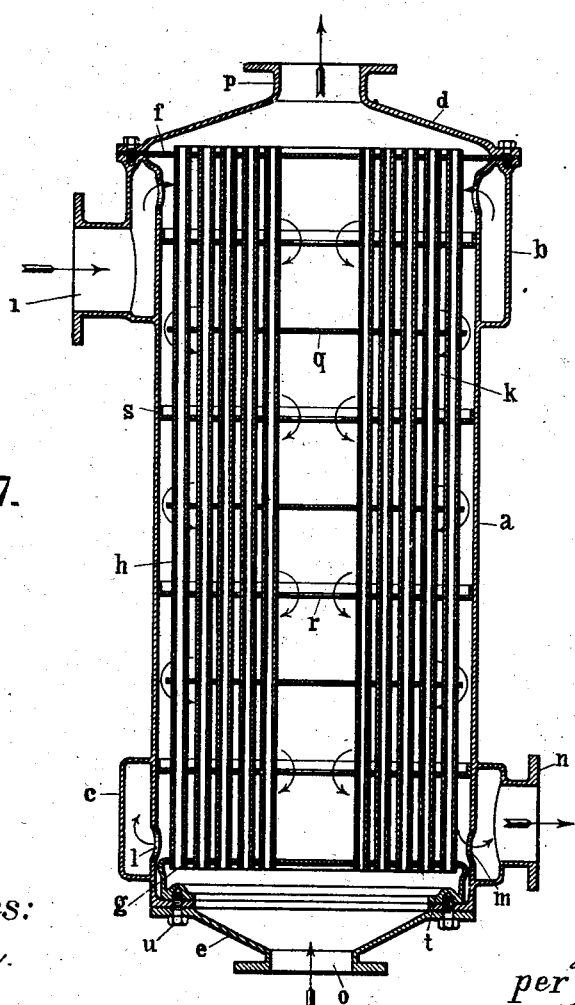
Witnesses:
F. G. Harder.
Jos. Schnitzler.
Inventor:
Hugo Junkers
per Martin Schmetz
Attorney.

UNITED STATES PATENT OFFICE.

HUGO JUNKERS, OF AIX-LA-CHAPELLE, GERMANY.

SURFACE CONDENSER.

SPECIFICATION forming part of Letters Patent No. 721,310, dated February 24, 1903.

Application filed January 20, 1902. Serial No. 90,369. (No model.)

*To all whom it may concern:*

Be it known that I, HUGO JUNKERS, professor in the Royal Polytechnicum at Aix-la-Chapelle, a subject of the King of Prussia, Emperor of Germany, residing at No. 52 Boxgraben, Aix-la-Chapelle, in the Kingdom of Prussia, Empire of Germany, have invented certain new and useful Improvements in Surface Condensers; and I do hereby declare the following to be a full, clear, and exact description of the invention, such as will enable others skilled in the art to which it appertains to make and use the same.

The present invention relates to a surface condenser distinguishing itself very advantageously from the surface condensers now in use by the fact that the exhaust-steam, as well as the cooling-water, comes into contact with the cooling-surfaces, consisting of involute-shaped tubes, by passing through as narrow as practicable channels of at all points equal width whose sides are formed by the above-mentioned tubes, so that both bodies, the one radiating the heat as well as the one absorbing it, may be led in very thin layers over the walls of the tubes separating both bodies from each other. To this end the tubes have been shaped, as indicated above, to conform to the involute and are arranged on lines answering to the conditions thereof.

Figure 1:
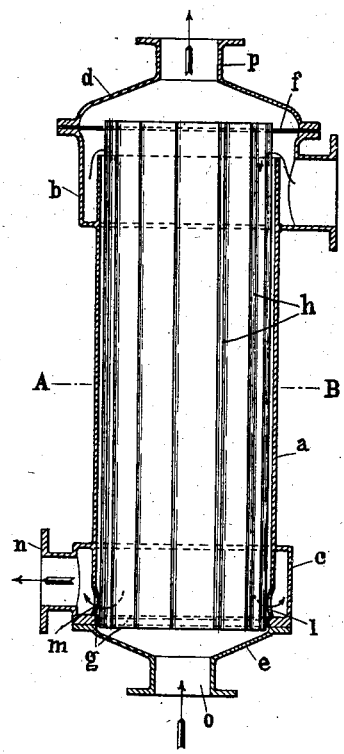
Figure 3:
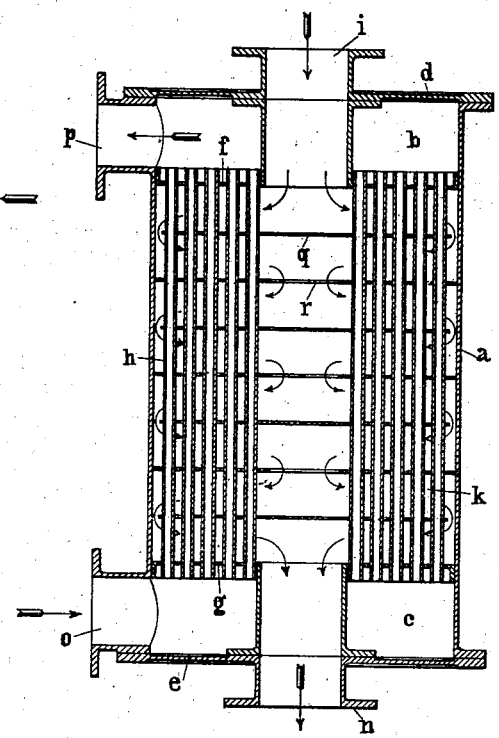
Figure 2:
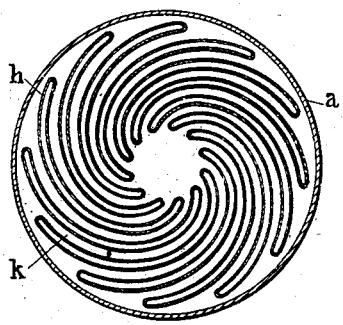
Figure 4:
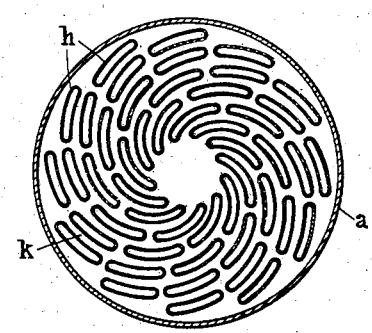

In the accompanying drawings, Figure 1 is a longitudinal sectional view of the new surface condenser. Fig. 2 is a cross-sectional view of the same condenser on line A B of Fig. 1, on a larger scale. Fig. 3 is a longitudinal sectional view of a modification of the new surface condenser. Fig. 4 is a cross-sectional view of a condenser having its tubes arranged in rows on involute lines. Figs. 5 and 6 are views showing different ways of protecting broader involute-shaped tubes against collapsing or distortion. Fig. 7 is a longitudinal sectional view of another modification of the new surface condenser.

The casing of the new surface condenser consists, chiefly, of a shell *a*, provided at both ends with heads or compartments *b c*, having detachable covers *d* and *e*, respectively. In Fig. 1 the tube-plate *f* is secured between the flanges of the upper head *b* and its cover *d*, while the under tube-plate *g* may form a part of the shell *a*, yet be removable therefrom with the tubes as shown here, or it may be made separately, as the tube-plate *f*, and be held between the flanges of the under head *c* and its cover *e*. The ends of the tubes *h* may be fastened to the tube-plate *g* in any desirable manner; but the upper ends of them are secured in this instance by soldering them to the tube-plate *f*. By these means a very elastic construction is obtained, so that when expansion of the tubes *h* takes place the tube-plate *f* and also the tube-plate *g* may accommodate themselves to this new condition. The tube-plates *f* and *g* are provided with a number of slots having exactly the shape of the tubes *h*, shaped to conform to a curve known as the "involute." The tube-plates *f* and *g*, as well as the tubes *h*, are made of the thinnest metal consistent with the safe working of the condenser and soldered to each other or connected in any other advantageous way, so that all disadvantages arising from leaky ferrules, so commonly met with in the older surface condensers, are avoided. Another great advantage is gained by being able to arrange the involute-shaped tubes in such close proximity that the steam, as well as the cooling-water, can be divided up in such thin layers that the to-be-condensed steam must come into contact with the thin walls of the tubes and be condensed under the most favorable conditions, far more so as ever it can be done in the older surface condensers employing round tubes. The exhaust-steam enters the condenser at *i*, flows into the head or compartment *b*, and finds its way over the upper end of the shell *a* to the narrow (at all points equally wide) channels *k* between the involute-shaped tubes *h*, condenses on its way to the bottom plate *g*, and leaves the inside of the shell *a* through the holes *l m* and flows as a mixture of steam and water through the branch *n*, from whence it may be led to any desirable point. The cooling-water enters the cover *e* at *o*, flows through the tubes *h* upward, and through the branch *p* off to the hot-well. It is evident that the cooling-water may enter the condenser at *n* and the exhaust-steam at *p* and flow off at *i* and *o*, respectively, as it may be thought most suitable for each individual case.

The modification of the surface condenser shown in Fig. 3 differs mainly in this respect from the one shown in Fig. 1, that the channels between the tubes $h$ are closed at certain intervals by the interposed baffle-plates $q$ and $r$ in such a manner that the exhaust-steam entering at $i$ is compelled to pass between said tubes $h$ until it reaches the outer ledge of the baffle-plate $q$, then return toward the center of the condenser until it reaches the opening of the baffle-plate $r$, and so on until it can escape through the branch $n$ as a mixture of steam and water. The cooling-water traverses the condenser in a similar manner as described above in regard to Fig. 1.

In the second modification of the new surface condenser (shown in Fig. 7) the baffle-plates $q$ and $r$ are similarly arranged as in Fig. 3; but here the plates $r$ are provided with flanges $s$, fitting the shell $a$ as closely as possible, yet admitting of being drawn out with said plates and the tubes for repair or cleaning purposes. For this reason the under tube-plate $g$ is provided with a flange $t$, secured to the inside flange of the shell $a$ by means of bolts $u$. In regard to the passage of the exhaust-steam and the cooling-water it might be here repeated that said passages are as suitable for conducting the exhaust-steam as well as the cooling-water.

Comparing Fig. 1 to Fig. 3 and Fig. 7 it will be noticed that in the former the steam will pass through the condenser in an axial direction, whereas Fig. 3 and Fig. 7 show at a glance that here the steam must make a very tortuous way in a radial direction.

As the tubes are made of a very thin material and their shape shows very flat curves, it is necessary to strengthen the walls of broader tubes of this kind in order to protect them against collapsion or distortion, which may be done, as in Fig. 5, by strips $v$, soldered to the inside of the tube-walls, or by connecting said tube-walls by stay-bolts $w$ and interposed sleeves $x$. If it is desirable to avoid this way of strengthening the tubes, the latter may be made narrower and arranged in rows on involute lines, as shown in Fig. 4. By means of this arrangement and connection of the tubes $h$ to the tube-plates by soldering it is not only possible to do away with the ferrules now in use, but also to have an absolute tight tube system capable of adjusting itself without let or hindrance to suit the expansion of the tubes while at work and above all to use the space inside of the shell in the most economical way and distribute the exhaust-steam in the most advantageous manner, besides permitting the use of the thinnest material most suitable for the equalization of the temperatures of the exhaust-steam and of the cooling-water and obtain the largest cooling-surface in a relatively small space.

I claim—

1. A surface condenser consisting of a shell provided at both ends with heads or compartments for the inlet and outlet of steam, covers for said heads or compartments with inlet and outlet for the cooling-water, tube-plates adjacent to each head or compartment, and involute-shaped tubes soldered to said tube-plates and arranged on involute lines to form very narrow and at all points equally-wide channels.

2. In a surface condenser the combination of a shell provided at one end with a head or compartment for the inlet of steam and at the other end with a similar head or compartment for the outlet of steam, removable covers provided with the cooling-water inlet and outlet respectively, tube-plates adjacent to each head or compartment, involute-shaped tubes soldered to said tube-plates and arranged on involute lines to form at all points equally-wide but narrow channels, and baffle-plates between said tubes to change the direction of the steam.

3. In a surface condenser the combination of an outer shell provided at each end with heads or compartments for the distribution of the steam to and collection of the mixture of steam and water from the channels formed by the walls of involute-shaped tubes, removable covers on said heads or compartments with cooling-water inlet and outlet respectively, tube-plates in close proximity to said heads or compartments, involute-shaped tubes soldered to said plates and arranged on involute lines, and baffle-plates secured to said tubes capable of being withdrawn from the shell together with said tubes.

4. In a surface condenser of the class described a removable tube system comprising elastic tube-plates, involute-shaped tubes arranged on involute lines and soldered to said elastic tube-plates to allow for the expansion and contraction of the tubes at different temperatures, and baffle-plates, substantially as shown and described.

5. In a surface condenser of the class described a removable tube system, comprising elastic tube-plates, involute-shaped tubes and means for preventing the collapsion and distortion of said tubes, substantially as shown and described.

In testimony that I claim the foregoing as my invention I have signed my name in presence of the subscribing witnesses.

HUGO JUNKERS.

Witnesses:
JOHN B. ADAMS,
H. QUADFLIEG.